(12) United States Patent  
D'Amone et al.

(10) Patent No.: US 12,140,762 B2
(45) Date of Patent: Nov. 12, 2024

(54) VISION-CONTROL SYSTEM FOR NEAR-EYE DISPLAY

(71) Applicant: Microsoft Technology Licensing, LLC, Redmond, WA (US)

(72) Inventors: Gabriele D'Amone, Mountain View, CA (US); Jouya Jadidian, Los Gatos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/156,338

(22) Filed: Jan. 18, 2023

(65) Prior Publication Data

US 2024/0241379 A1 Jul. 18, 2024

(51) Int. Cl.
*G02B 26/08* (2006.01)
*G02B 27/01* (2006.01)
*G02F 1/163* (2006.01)

(52) U.S. Cl.
CPC ..... *G02B 27/0172* (2013.01); *G02B 26/0841* (2013.01); *G02F 1/163* (2013.01)

(58) Field of Classification Search
CPC .. G02B 27/0172; G02B 25/0841; G02F 1/163
See application file for complete search history.

(56) References Cited

U.S. PATENT DOCUMENTS

| 5,012,206 | A | 4/1991 | Tigges | |
| 2008/0151175 | A1* | 6/2008 | Gross | G02C 7/105 351/45 |
| 2009/0219039 | A1 | 9/2009 | Fasshauer | |
| 2015/0370071 | A1 | 12/2015 | Alton | |
| 2019/0212822 | A1 | 7/2019 | Keller et al. | |
| 2020/0133031 | A1* | 4/2020 | Muramatsu | G02C 7/083 |
| 2022/0214550 | A1* | 7/2022 | Machida | G02B 27/0176 |

FOREIGN PATENT DOCUMENTS

| CN | 216351557 U | 4/2022 |
| EP | 0998659 A1 | 5/2000 |
| WO | 2017143128 A1 | 8/2017 |

OTHER PUBLICATIONS

"smart film, PDLC film, switchable film, switchable glass, intelligent glass, switchable glass film", Retrieved From: https://www.youtube.com/watch?v=30TjTBt6IBY, Jan. 16, 2015, 5 Pages.
"International Search Report and Written Opinion Issued in PCT Application No. PCT/US22/028879", Mailed Date: Aug. 9, 2022, 14 Pages.
International Search Report and Written Opinion received for PCT Application No. PCT/US23/084976, Apr. 9, 2024, 15 pages.

* cited by examiner

*Primary Examiner* — Robert J Michaud

(74) *Attorney, Agent, or Firm* — Alleman Hall & Tuttle LLP

(57) ABSTRACT

A vision-control system comprises an electrochromic insert and at least two peripheral contacts. The electrochromic insert includes at least two transparent electrodes and is configured for arrangement on a side of a head-worn frame of a near-eye display system. The peripheral contacts extend to the transparent electrodes.

20 Claims, 12 Drawing Sheets

VISION-CONTROL SYSTEM FOR NEAR-EYE DISPLAY

BACKGROUND

Near-eye display technology has evolved in recent years to become an emerging consumer technology. In head-worn systems, for example, binocular near-eye display provides 3D stereo vision for virtual-reality (VR) presentation. When implemented using see-thru optics or pass-thru video, near-eye display enables mixed- or augmented-reality (AR) presentation, in which VR elements are admixed into the user's natural field of view.

SUMMARY

One aspect of this disclosure relates to a vision-control system comprising a near-eye display system coupled to a head-worn frame, a vision system providing pass-thru video to the near eye display system, and an electrochromic insert with at least two peripheral contacts and a control circuit. The electrochromic insert is arranged on a side of the head-worn frame, with the peripheral contacts extending, respectively, to at least two transparent electrodes. The control circuit is coupled electrically to the peripheral contacts and configured to apply a voltage to the peripheral contacts pursuant to a control signal, to vary the transmittance of the electrochromic insert.

Another aspect of this disclosure relates to a vision-control system comprising an electrochromic insert and at least two peripheral contacts. The electrochromic insert includes at least two transparent electrodes and is configured for arrangement on a side of a head-worn frame of a near-eye display system. The peripheral contacts extend to the transparent electrodes.

Another aspect of this disclosure relates to a method to operate a vision-control system with an electrochromic insert arranged on a side of a head-worn frame of a near-eye display system. The method comprises (a) receiving a control signal; and (b) pursuant to receiving the control signal, electrically biasing at least two peripheral contacts coupled electrically to at least two transparent electrodes of the electrochromic insert. Here and above, the optical transmittance of the electrochromic insert varies in dependence on an electrical bias applied to the transparent electrodes.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any disadvantages noted in any part of this disclosure.

DETAILED DESCRIPTION

The defining feature of VR is its ability to submerge the user in a fully immersive, virtual experience. Nevertheless, there are scenarios in which it is desirable or necessary to allow reality to interrupt, infringe, or co-mingle with the user's virtual experience. For instance, a user may want to pause a VR experience to take an important phone call or interact with a visitor. Scenarios in which a VR experience is paused and then resumed in short order should be handled smoothly by the technology, with a minimum of user effort. Ideally, it should be unnecessary for the user to remove their VR headset only to put it back on a short time later.

In VR headsets equipped with a world-facing vision system, pass-thru video from the vision system to the near-eye display is a useful feature for managing the scenarios above. Pass-thru video can be switched on pursuant to a voice command or external sound, to other forms of user input, or to motion sensed around the headset. The pass-thru video solution may be incomplete, however, due to practical limitations on the field-of-view (FOV) that the near-eye display is configured to provide or that the world-facing vision system is configured to capture. More specifically, the pass-thru video may lack high-angle content corresponding to the full range of the user's natural peripheral vision.

This disclosure provides a series of vision-control systems that address the above issue and provide further advantages. Common to each of the vision-control systems is an electrochromic insert arranged on opposite, peripheral sides of a near-eye display frame. The electrochromic insert may be opaque in the unpowered state, to prevent real imagery from the user's periphery from infringing the VR experience. The electrochromic insert is coupled, however, to a control circuit configured to increase the optical transmittance of the insert pursuant to a suitable control signal. As noted above in connection to pass-thru video, the control signal may be raised pursuant to any desired triggering condition—e.g., user input or motion sensed around the headset.

In some vision-control systems the electrochromic insert is partially dimmable—continuously or in discrete steps—such that the brightness of the peripheral imagery it admits can be adjusted to the brightness of the pass-thru video. In some vision-control systems the electrochromic insert is detachable from the near-eye display frame; it may be arranged within a window of a side shield attached to the frame, for instance.

Figure 1:
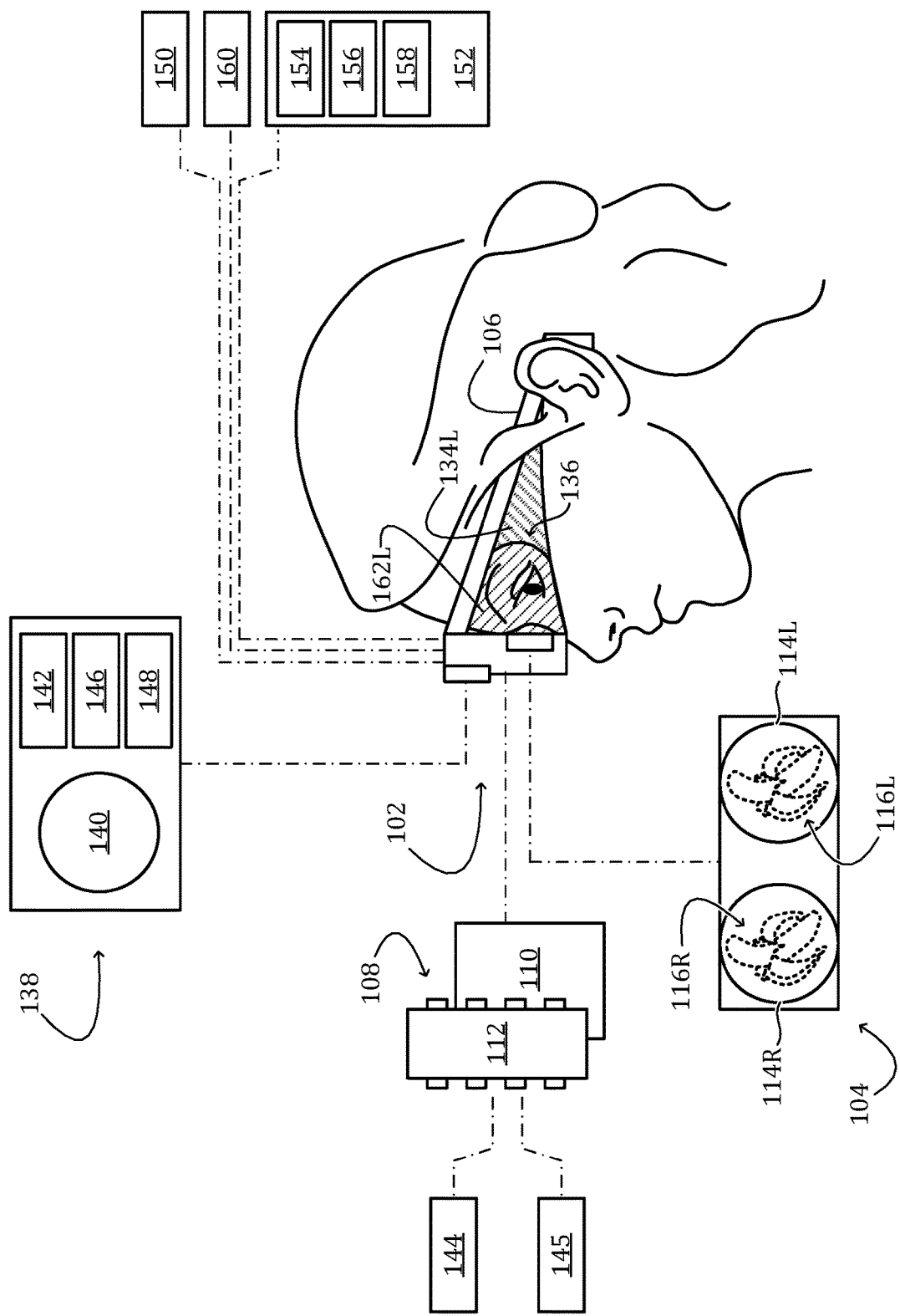
FIG. 1 shows aspects of an example vision-control system with an integrated near-eye display system.

Turning now to the drawings, FIG. 1 shows aspects of an example vision control system 102. The vision-control system is configured to be worn by a user and to exert active control over the visual imagery received by the user. In this manner, the vision-control system may present and/or marshal an immersive virtual reality for the benefit of the user. In the example illustrated in FIG. 1, vision-control system 102 includes a near-eye display system 104 coupled to a head-worn frame 106.

Near-eye display system 104 is configured to display still or moving images in the user's field-of-view. In some examples, the near-eye display system presents computer-generated, holographic imagery which the user may interact with (e.g., manipulate). To support these functions, inter alia, vision-control system 102 includes an onboard computer 108 having a processor 110 and associated computer memory 112. In the example illustrated in FIG. 1, head-worn frame 106 takes the form of a visor. In other examples the head-worn frame may take the form of goggles, a helmet, or safety glasses, etc.

Near-eye display system 102 is configured for binocular image display. To that end, the near-eye display system includes a right monocular system 114R that presents a right display image 116R in front of the user's right eye, and a left monocular system 114L that presents a left display image 116L in front the user's left eye. For stereoscopic display the right and left display images may be configured with stereo disparity (vide infra) appropriate to display a three-dimensional subject or scene.

Figure 2:
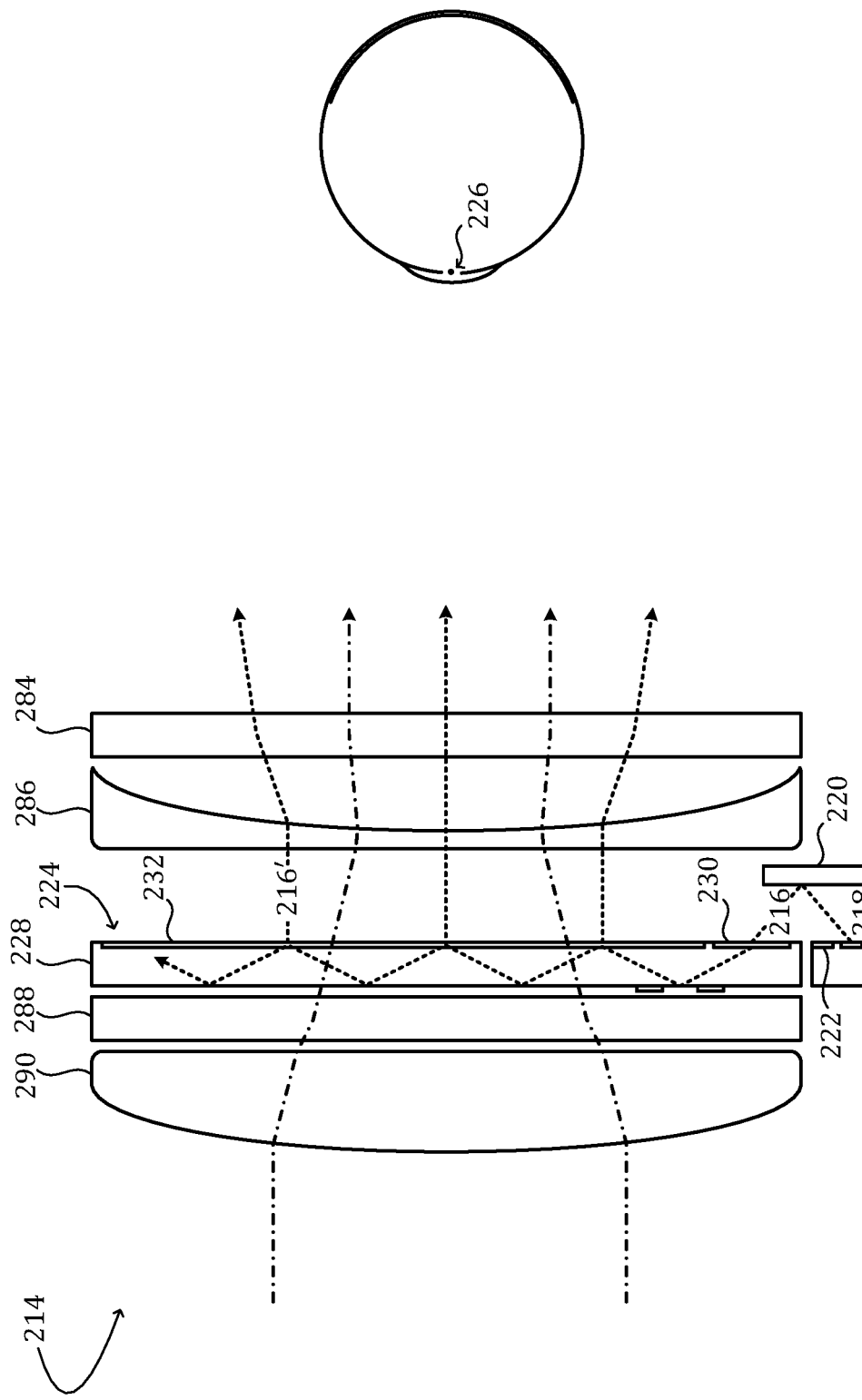
FIG. 2 shows aspects of an example monocular system of a near-eye display system.

FIG. 2 shows aspects of an example monocular system 214 of a near-eye display system. The monocular system includes a display projector 218 configured to form a display image 216. The display projector includes a high-resolution spatial light modulator (SLM) 220 illuminated by light emitters 222. The light emitters may comprise light-emitting diodes (LEDs) or laser diodes, and the SLM may comprise a liquid-crystal-on-silicon (LCOS) or digital micromirror device (DMD), for example. The SLM and the light emitters are coupled operatively to a vision-control system computer (such as computer 108 of FIG. 1). The computer controls the matrix of independent, light-directing pixel elements of the SLM so as to cause the SLM to modulate the light received from the light emitters and thereby form display image 216. By controlling the light modulation temporally as well as spatially, the computer may cause the display projector to project a synchronized sequence of display images (i.e., video). In the example shown in FIG. 2, the display image is formed by reflection from the SLM. In other examples, a display image may be formed by transmission through a suitably configured, transmissive SLM. Display projectors based on other technologies are equally envisaged—organic LED arrays, micro-LED (μLED) arrays, scanning-laser projectors, etc.

In monocular system 214, display light from display projector 218 passes through a physical aperture of finite size. Optics downstream of the display projector focus the display light onto the anatomical right or left pupil of the user. In doing so, the downstream optics direct the display light through an entry pupil, defined as the image of the physical aperture at the anatomical-pupil position. Due to the small size of the physical aperture and/or other features of monocular system 214, the entry pupil may be too small to align reliably to the user's anatomical pupil. Accordingly, monocular system 214 includes an expansion optic 224. The expansion optic is configured to receive display light through a relatively small entry pupil and to release the display light over an expanded exit pupil, which may be large enough to cover the entire area over which the user's pupil is likely to be. Such an area is called an 'eyebox'.

Expansion optic 224 is configured to receive display image 216 from display projector 218 and to release an expanded form 216' of the display image toward the pupil position 226. In the illustrated example, the expansion optic includes an optical waveguide 228, an entry grating 230 and an exit grating 232. The expansion optic may also include other gratings not shown in FIG. 2. It will be understood that the term 'grating' is broadened herein to include any kind of diffractive optical element (DOE), irrespective of whether that element includes a pattern of elongate diffractive features. Non-limiting example gratings include a surface-relief type grating comprising a series of closely spaced channels formed on the optical waveguide, or a volume grating or index-modulated grating formed in the optical-waveguide material.

Entry grating 230 is a diffractive structure configured to receive display image 216 and to couple the light of the display image into optical waveguide 228. After coupling into the optical waveguide, the display light propagates through the optical waveguide by total internal reflection (TIR) from the front and back faces of the optical waveguide. Exit grating 232 is a diffractive structure configured to controllably release the propagating display light from the optical waveguide in the direction of pupil position 226. To that end, the exit grating includes a series of light-extraction features arranged from weak to strong in the direction of display-light propagation through the optical waveguide, so that the display light is released at uniform intensity over the length of the exit grating. In this manner, expansion optic 224 may be configured to expand the exit pupil of display projector 218 so as to fill or slightly overfill the eyebox of the user. This condition provides desirable image quality and user comfort.

In some examples, expansion optic 224 may expand the exit pupil of display projector 218 in one direction only—e.g., the horizontal direction, in which the most significant eye movement occurs. Here, the display projector itself may offer a large enough exit pupil—natively, or by way of a vertical pre-expansion stage—so that vertical expansion within the optical waveguide is not necessary. In other examples, expansion optic 224 may be configured to expand the exit pupil in the horizontal and vertical directions. In such examples, display light propagating in a first direction within the optical waveguide may encounter a turning grating (not shown in FIG. 2) having a plurality of diffraction features arranged weak to strong in a first direction. The turning grating may be configured such that the light diffracted by the diffraction features is turned so as to propagate in a second direction, having now been expanded in the first direction. Parallel rays of the expanded light then encounter exit grating 232 and are out-coupled from the waveguide as described above. Despite the utility of diffractive optical elements for coupling light into and out of an optical waveguide, in-coupling and out-coupling optical elements based on reflection, refraction, and/or scattering are also envisaged, as alternatives to DOEs.

Returning now to FIG. 1, vision-control system 102 includes left side shield 134L (and complementary right side shield not shown in FIG. 1). Each side shield is configured to block ambient light from reaching the user's eyes when the user is wearing frame 106. The light-blocking feature is important for providing an immersive VR experience, especially when virtual imagery of relatively low brightness is presented. In examples where monocular systems 114 are substantially opaque, side shields 134 block ambient light primarily from peripheral directions. In some examples, left side shield 134L is configured for attachment to the left side of frame 106. In some examples a side shield may follow the contour of the user's face and be called a 'face gasket'. In some examples a side shield may be detachable from the head-worn frame. This feature enables the side shield to be cleaned or replaced easily. In the illustrated example, side shield 134L includes a cut-out or window 136 surrounded by an opaque border. In other examples the window may be borderless. In still other examples the vision-control system may have no side shield at all.

Vision-control system 102 includes a vision system 138 coupled to frame 106 and configured to provide pass-thru video to near-eye display system 104. The vision system 138 includes at least one world-facing camera 140 configured to acquire video of the scene in front of the vision-control system. More specifically, the world-facing camera may have an optical axis oriented in the forward direction and an FOV spanning about ±50 horizontal degrees and about ±40 vertical degrees relative to the optical axis. Wider and narrower FOVs are equally contemplated.

Vision system 138 includes video-mix engine 142. The video-mix engine is configured to mix the video from the world-facing camera with virtual imagery from hologram engine 144 of computer 108. In this manner the vision system is configured to simulate an AR experience, based on the pass-thru video from the world-facing camera, augmented by the virtual imagery from the hologram engine.

Vision system 138 includes motion-sense engine 146 configured to sense motion around head-worn frame 106. To that end, the motion-sense engine receives input from inertial-measurement unit (IMU) 148. The IMU is coupled mechanically to the frame; it comprises a linear accelerometer, an electronic gyroscope, and (optionally) an electronic compass. The motion-sense engine periodically assesses the evolution of the image acquired by world-facing camera 140 in light of the concurrent change in the orientation of the frame. Image evolution not consistent with the change in orientation is registered as subject motion, which, in some examples, may be localized to one or more angles within the user's FOV. In this manner, the vision system embodies a motion sensor suitable for the objectives herein. In other examples a different kind of motion sensor may be used, such as a sonar- or lidar-based motion sensor. In these and other examples, motion-sense engine 146 or any other suitable motion sensor may be configured to raise a control signal pursuant to motion sensing around head-worn frame 106. As described in greater detail herein, the control signal may have the effect of suspending the immersive VR experience and allowing the user to see more of the external scene.

Vision-control system 102 includes a touchpad 150 configured to receive user input in the form of a finger touch or tap. While this form of input may serve various functions in a vision-control system, in some examples it particularly signals that the user wants to suspend the immersive VR experience and view more of the external scene. Accordingly, the touchpad may be configured to raise an appropriate control signal pursuant to detection of finger touch or tap. In other examples a mechanical switch or dial may be used in lieu of the touchpad. In still other examples, the position of the user (i.e., of frame 106) may be used as an indicator of intent to stay immersed or to exit the VR experience. In other words, the control signal may be raised when the user moves out of a pre-determined 'fenced' area.

Vision-control system 102 includes an audio-input system 152. In the illustrated example the audio-input system includes microphone 154, audio amplifier 156, and speech-recognition engine 158. The audio amplifier is configured to amplify audio signal from the microphone. The amplified audio signal may be received in speech-recognition engine 158, which is configured to recognize certain voice commands from the user. Most generally, the audio-input system is configured to raise a control signal pursuant to detection of sound picked by the microphone. In some examples the audio-input system raises the control signal on detection of any sound louder than a predetermined threshold. In other examples the audio-input system raises the control signal on detection of a recognized voice command—e.g., 'Show me the world'.

Vision-control system 102 includes control circuit 160 configured to control the admixture of real and virtual imagery received by the user. To that end the control circuit is configured to receive control signal from one or more vision-control system components. Such components may include, inter alia, motion-sense engine 146, touchpad 150, and/or audio-input system 152. Pursuant to receiving the control signal the control circuit causes video-mix engine 142 to increase the proportion of pass-thru video to near-eye display 104 and reduce the proportion of holographic content. In that scenario the user is able immediately to see as much of the real world as possible through vision system 138, without having to remove frame 106.

As noted hereinabove, the issue in this solution is that the FOV of near-eye display 104 and/or world-facing camera 140 may be limited relative to the user's anatomical FOV, which may be as wide as 180 degrees horizontal. In other words, a user receiving pass-thru video only, when requesting or requiring a world view, may lack sufficient peripheral vision to feel comfortable without removing frame 106. Reduced peripheral vision may be especially unnerving for the user when the world view is presented unexpectedly—e.g., in response to a barking dog or an unknown person entering the room. To address this issue and provide further advantages, left electrochromic insert 162L is arranged on the left side of head-worn frame 106 (and a right electrochromic insert is arranged on the right side, not shown in FIG. 1). In configurations that have side shields 134, each electrochromic insert may be configured to be received into the corresponding side shield—e.g., into a window or cut-out of the side shield. In some examples each electrochromic insert is configured to be detachable from the corresponding side shield-which, itself may be detachable from frame 106 in some configurations. The electrochromic insert provides the important technical effect of controllably blocking light that may reach the user's eyes from the left and right sides of the vision-control system. In some examples the electrochromic insert may be flexible, bendable, and/or curveable.

Figure 3:
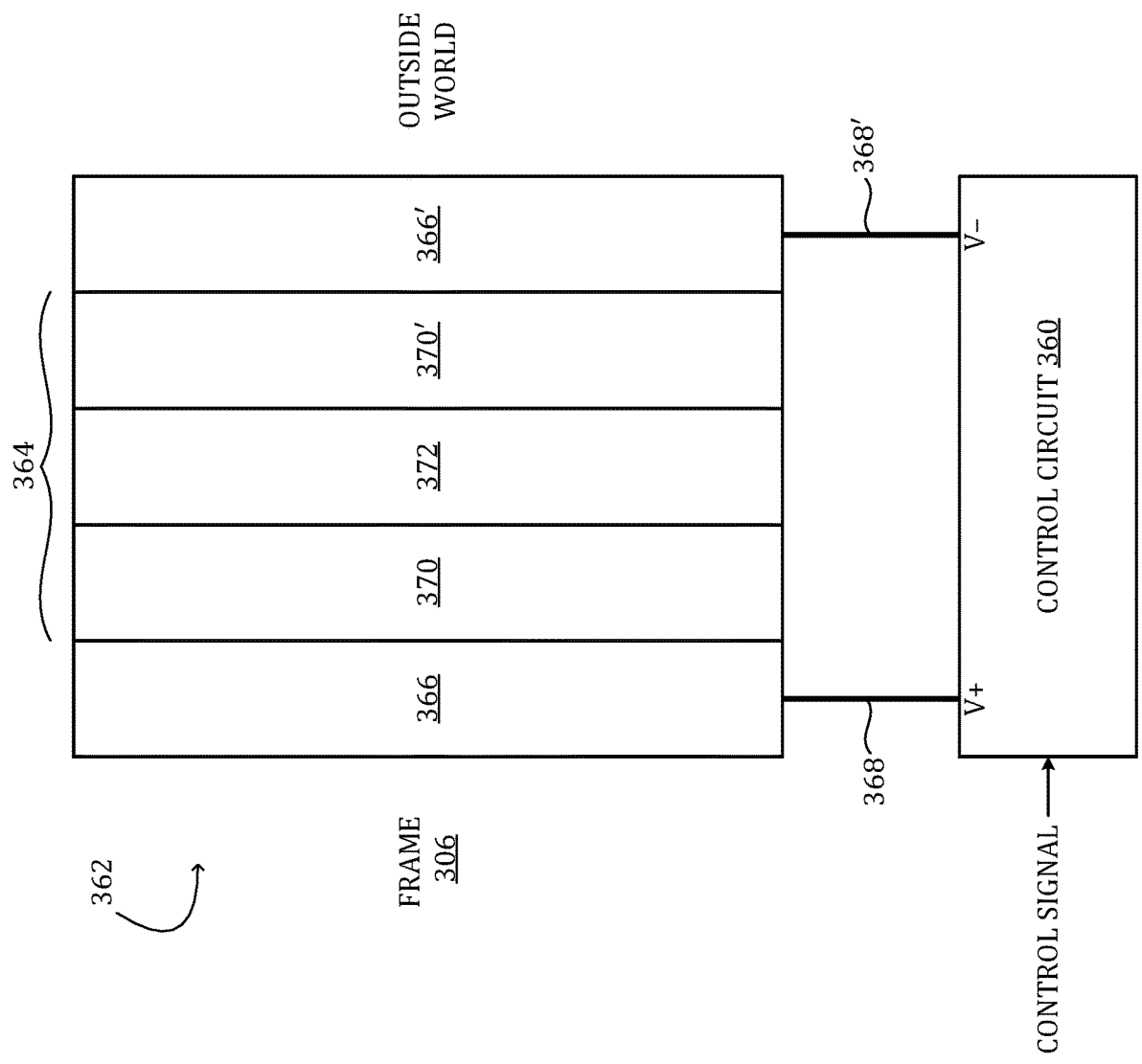
FIG. 3 shows aspects of an example electrochromic insert of a vision-control system.

In some configurations an electrochromic insert may include opposing transparent electrodes and a polymer film structure arranged between the opposing transparent electrodes. FIG. 3 shows additional aspects of an example electrochromic insert 362. In electrochromic insert 362, polymer-film structure 364 is sandwiched between transparent electrodes 366 and 366'. In some examples, each transparent electrode may comprise a film of a degenerately doped semiconductor, such as indium tin oxide (ITO) or fluorine-doped tin oxide (FTO). In some examples, each transparent electrode may comprise a microwire mesh. Peripheral contact 368 extends to transparent electrode 366, and peripheral contact 368' extends to transparent electrode 366'. The peripheral contacts provide an important technical effect of conveying controllable electrical bias to the opposing transparent electrodes. In this example, first electrochromic-conduction layer 370 is arranged adjacent first transparent electrode 366, and second electrochromic-conduction layer 370' is arranged adjacent second transparent electrode 366'. Ion-conduction layer 372 is arranged in between the first and second electrochromic-conduction layers.

In some examples each electrochromic-conduction layer comprises a film of redox-active material. The film may have an ion-conductive and/or ion-porous structure extending in the thickness direction, so as to provide a high areal density of redox-active sites coupled electronically to the adjacent transparent electrode. Ion-conduction layer 372 may comprise a polyelectrolyte loaded with exchangeable counterions. The ion-conduction layer may to some degree penetrate the electrochromic-conduction layers, such that the exchangeable counterions of the ion-conduction layer may access (migrate to and from) the redox-active sites of both electrochromic-conduction layers. This mechanism provides local charge balance when one of the electrochromic-conduction layers is oxidized and the other is reduced. The ion-conduction layer also serves as a barrier against direct electronic coupling between the first and second electrochromic-conduction layers. In typical examples the redox-active material of the first electrochromic-conduction layer differs from that of the second electrochromic-conduction layer, with at least one of the electrochromic-conduction layers comprising material whose optical transmittance changes with oxidation state. This material could be a transition-metal oxide (e.g., tungsten oxide) or mixture of transition-metal oxides, for example. When transient electrical bias is applied across the transparent electrodes, one of the electrochromic conduction layers is oxidized and the other is reduced, resulting in a net change in optical transmittance across polymer-film structure 364.

Despite the usefulness and efficiency of the configurations described herein, it should be noted that electrochromic inserts based on other physicochemical effects are equally envisaged. In some electrochromic inserts, for instance, the polymer-film structure may comprise a polymer-dispersed liquid-crystal (PDLC) layer sandwiched between the opposing transparent electrodes. Absent an applied electrical bias, randomly aligned liquid crystal molecules may scatter the light passing through the film, thereby reducing the optical transmittance. When electrical bias is applied, however, the electric field between the electrodes may align the liquid crystal molecules to the optical axis, thereby reducing the scattering cross-section and increasing the optical transmittance.

Figure 4:
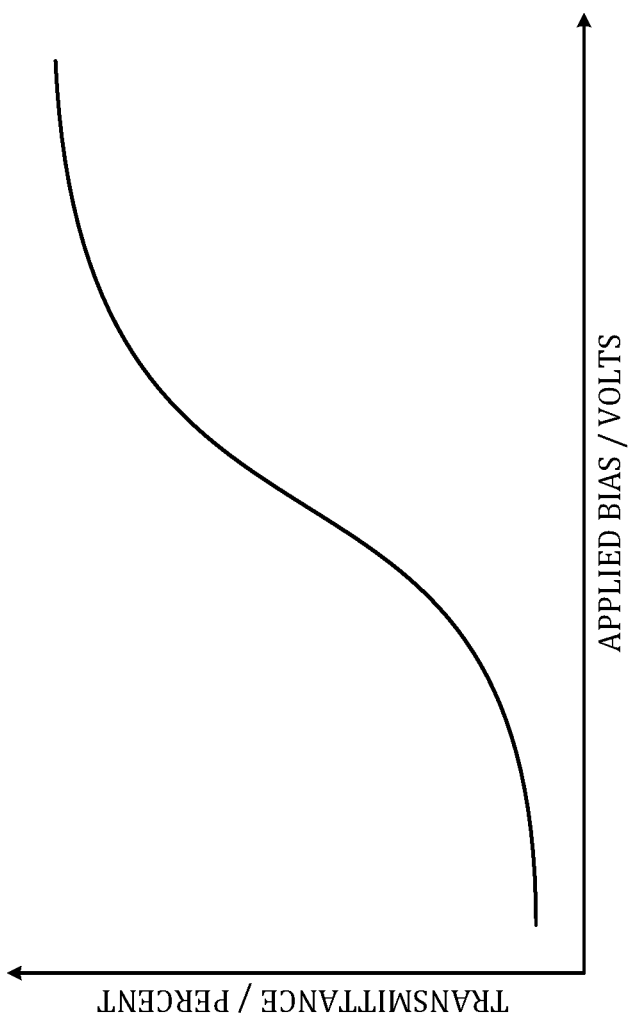
FIG. 4 is a hypothetical graph of transmittance versus applied voltage for an example electrochromic insert.

In order to support reversible bleaching of electrochromic insert 362, control circuit 360 is coupled electrically to peripheral contacts 368 and 368' and configured to apply a voltage to the peripheral contacts pursuant to a control signal supra. When electrodes 366 and 366' are unbiased, electrochromic insert 362 relaxes to a state of low optical transmittance. As the voltage between transparent electrodes 366 and 366' is increased, the electrochromic insert becomes more transmissive, commensurate to the magnitude of the applied voltage. Thus, the control circuit provides the important technical effect of controlling the optical transmittance of the electrochromic insert, so that the light reaching the user's eyes from the left and right sides can be controllably blocked. FIG. 4 is a hypothetical graph of optical transmittance as a function of applied voltage for an electrochromic insert comprising a polymer film structure arranged between opposing transparent electrodes. Generally speaking, the optical transmittance of the electrochromic insert varies in dependence on the electrical bias applied to the transparent electrodes thereof. Typically the transmittance change is substantially independent of wavelength over the visible spectrum. As shown in the graph, intermediate applied voltage provides intermediate optical transmittance.

Figure 5:
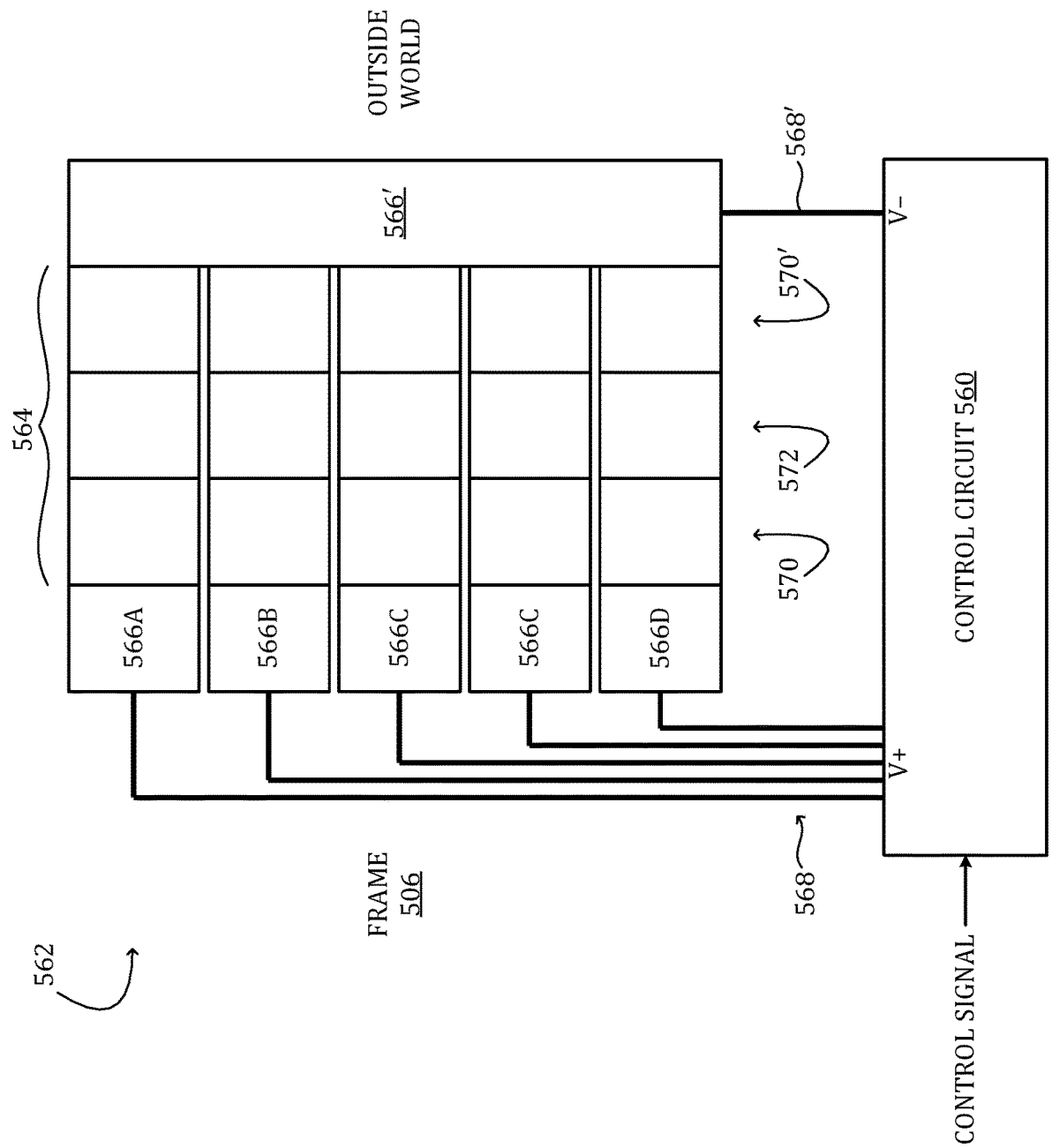
FIG. 5 shows aspects of another example electrochromic insert of a vision-control system.

FIG. 5 shows aspects of another electrochromic insert 562. Electrochromic insert 562 includes a common transparent electrode 566' and a series of opposing transparent electrodes, 566A through 566D, stacked parallel to the common electrode. In this configuration each of the opposing electrodes is biased independently via a corresponding peripheral contact 568. In the illustrated example electrochromic layers 570 and 570' and ion-conduction layer 572 are segmented in registry with the series of opposing transparent electrodes. In other examples the layers may be continuous. In vision-control systems that incorporate electrochromic insert 562, control circuit 560 may be configured to bias each of the peripheral contacts individually-applying, in some scenarios, a different voltage to each electrode. This feature may be used to provide a controlled gradation of optical transmittance along the electrochromic insert.

Figure 6:
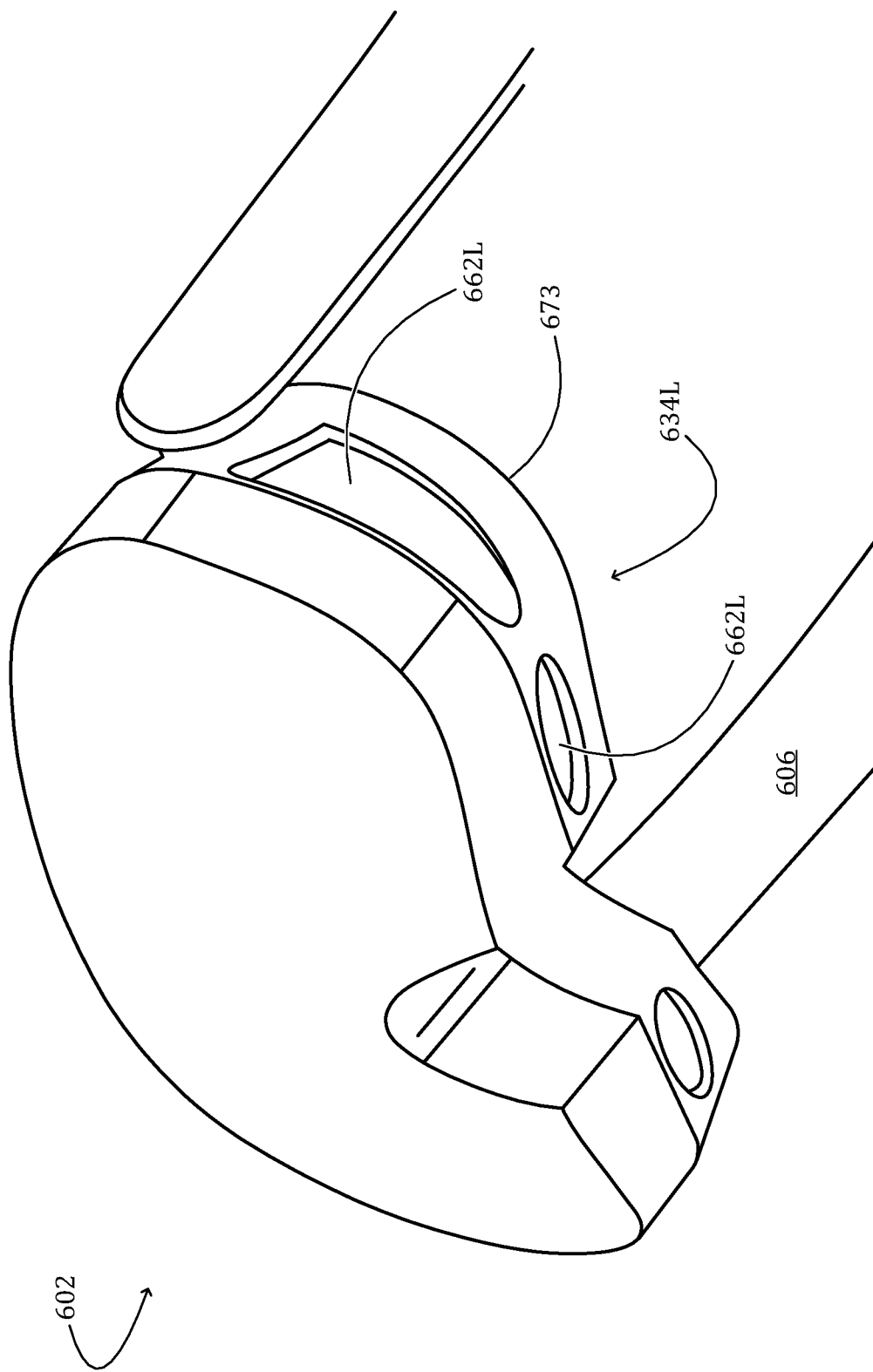
FIG. 6 shows aspects of another example vision-control system.

FIG. 6 shows aspects of another electrochromic insert 662L. Electrochromic insert 662L curves around from the left side to the bottom of head-worn frame 606, so that light originating from below the device may be controllably blocked. In vision-control system 602, side shield 634L includes an opaque border 673 surrounding the windows through which the electrochromic insert is exposed. More generally, a vision-control system may include any number of electrochromic inserts at one or more different positions on a head-worn frame, which may be integrated into the frame or detachable from the frame.

Figure 7:
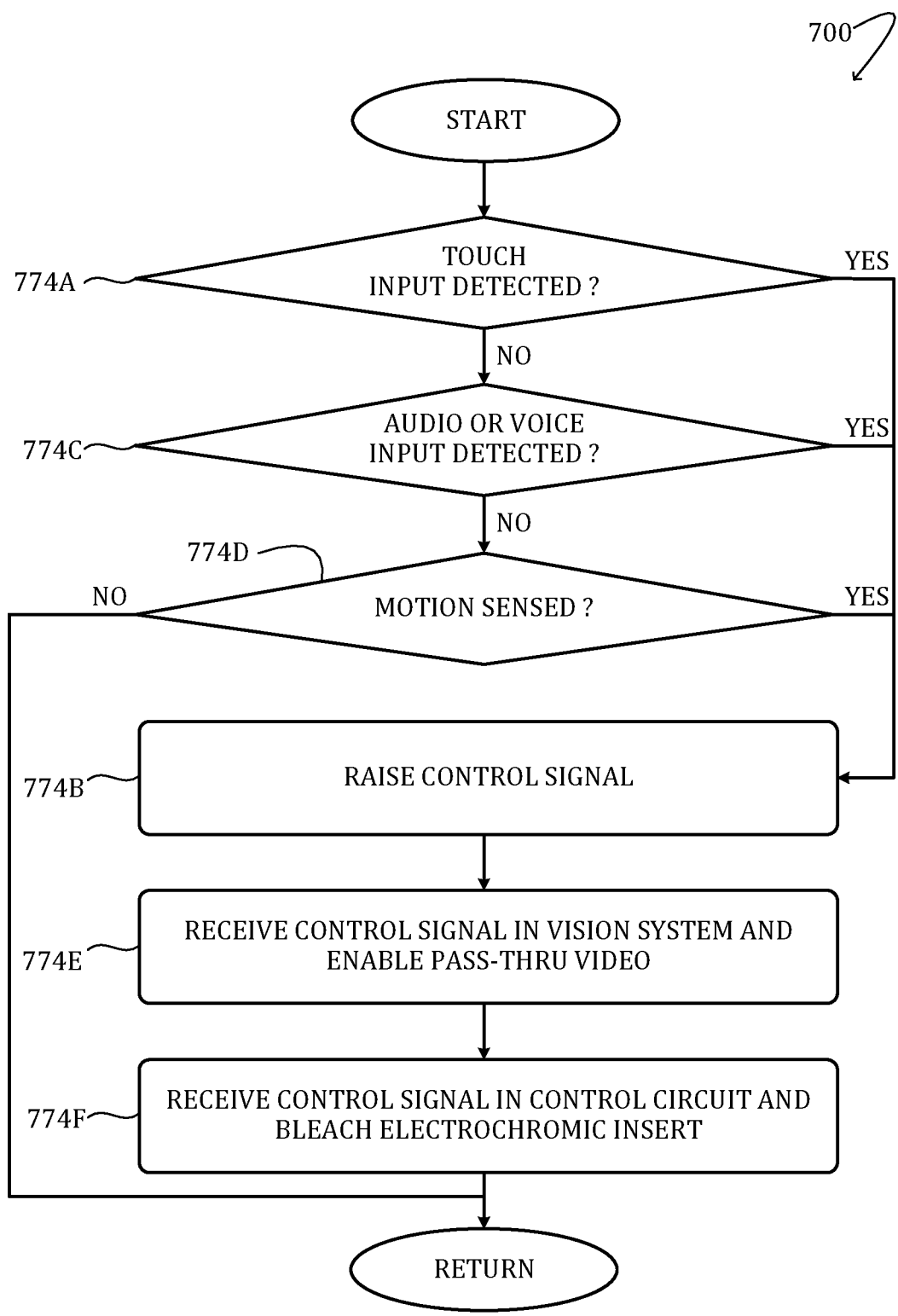
FIG. 7 shows aspects of an example method to operate a vision-control system.

FIG. 7 shows aspects of an example method 700 to operate a vision-control system as disclosed herein. As noted above, the vision-control system includes an electrochromic insert arranged on a side of a head-worn frame of a near-eye display system.

Method 700 includes operations that check for certain forms of user input, which may indicate that the user wants or needs to see more of the real world. Any of these operations may be omitted depending on the implementation, or others may be added. At 774A, for instance, the vision-control system checks for finger touch on a touchpad of the head-worn frame and raises a control signal, at 774B, if finger touch is detected. At 774C the vision-control system checks for sound from a microphone of the audio-input system and raises a control signal if sound louder than a predetermined threshold is picked up. In some examples the audio-input system may perform voice recognition on the sound received from the microphone and may raise the control signal if the user has spoken a certain voice command. Thus, in some examples the control signal may be raised pursuant to input from a user of the near-eye display system arranged in the head-worn frame.

At 774D of method 700 a motion sensor of the vision-control system checks for motion sensed around the head-worn frame. If motion above a predetermined threshold is sensed, then the vision-control system raises a control signal.

At 774E the video-mix system of the vision-control system, pursuant to receiving the control signal, enables pass-thru video from the world facing camera to the near-eye display system. At 774F the control circuit of the electrochromic insert, pursuant to receiving the control signal, biases at least two peripheral contacts coupled electrically to at least two transparent electrodes of the electrochromic insert, thereby increasing the optical transmittance of the electrochromic insert and, accordingly, the user's peripheral view of the real world.

As noted hereinabove, control signal for enabling pass-thru video and for bleaching the electrochromic insert may be raised pursuant to user input, audio input, and/or motion sensed. In some examples, exactly the same control signal that enables the pass-thru video also causes the electrochromic insert to bleach. In other examples the pass-thru video is enabled pursuant to a first control signal, and the electrochromic insert is bleached pursuant to a second control signal distinct from the first control signal. Moreover, the user input, audio input, and/or motion sensing may map to the distinct first and second control signals in any useful way. In one non-limiting example, motion sensing may raise the first control signal only, whereas user input or audio input may raise both the first and second control signals. In another non-limiting example, motion sensed substantially in front of the vision-control system may raise the first control signal, whereas motion to the side of the head-worn frame may raise the second control signal. Generally speaking, the triggering of the control circuit may be compatible with virtually any suitable control strategy.

Thus, in configurations where the first and second control signals are distinct, the video-mix engine at 774E may receive the first control signal and, in response, enable pass-thru video from the world-facing camera to the near-eye display. At 774F the control circuit may receive the second control signal and, in response, increase the voltage applied between opposing transparent electrodes of the electrochromic insert.

Figure 8:
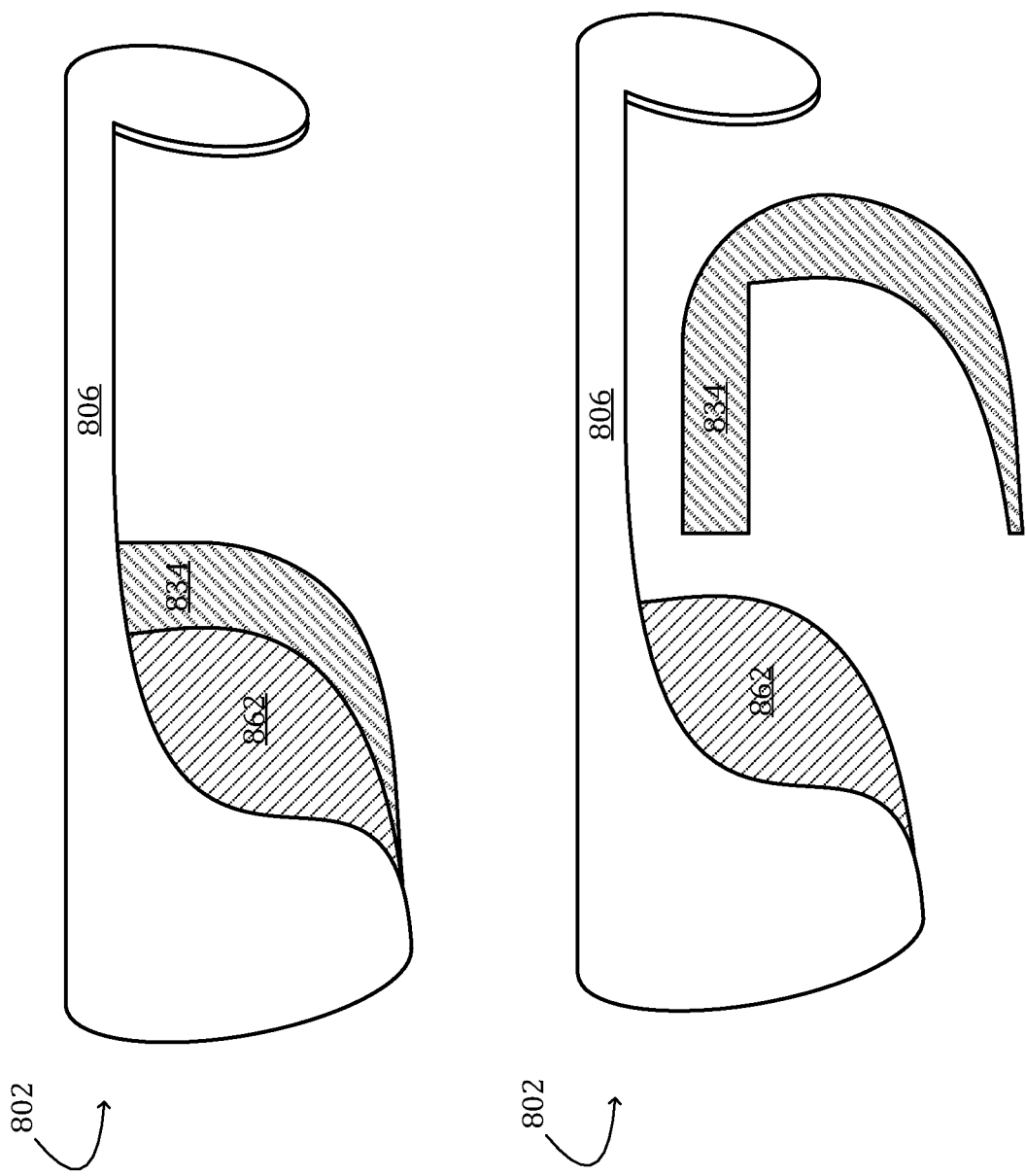
FIGS. 8 through 10 show aspects of other example vision-control systems.

In the example illustrated in FIG. 1, near-eye display system 104 is fully integrated into vision-control system 102. An analogous configuration is shown in FIG. 8, where side shield 834 is detachable from head-worn frame 806 and electrochromic insert 862. The detachable side shield provides the important technical effect of making it possible to clean the side shield (which regularly contacts the user's face) using products that may not be suitable for use on the electronic componentry of the headset. In other examples, a vision-control system may be an add-on to a near-eye display system. That approach enables a vision-control system to be offered after-market to owners of compatible near-eye display systems. Furthermore, it may enable components of the vision-control and near-eye display systems to be cleaned, serviced, and/or replaced separately.

Figure 9:
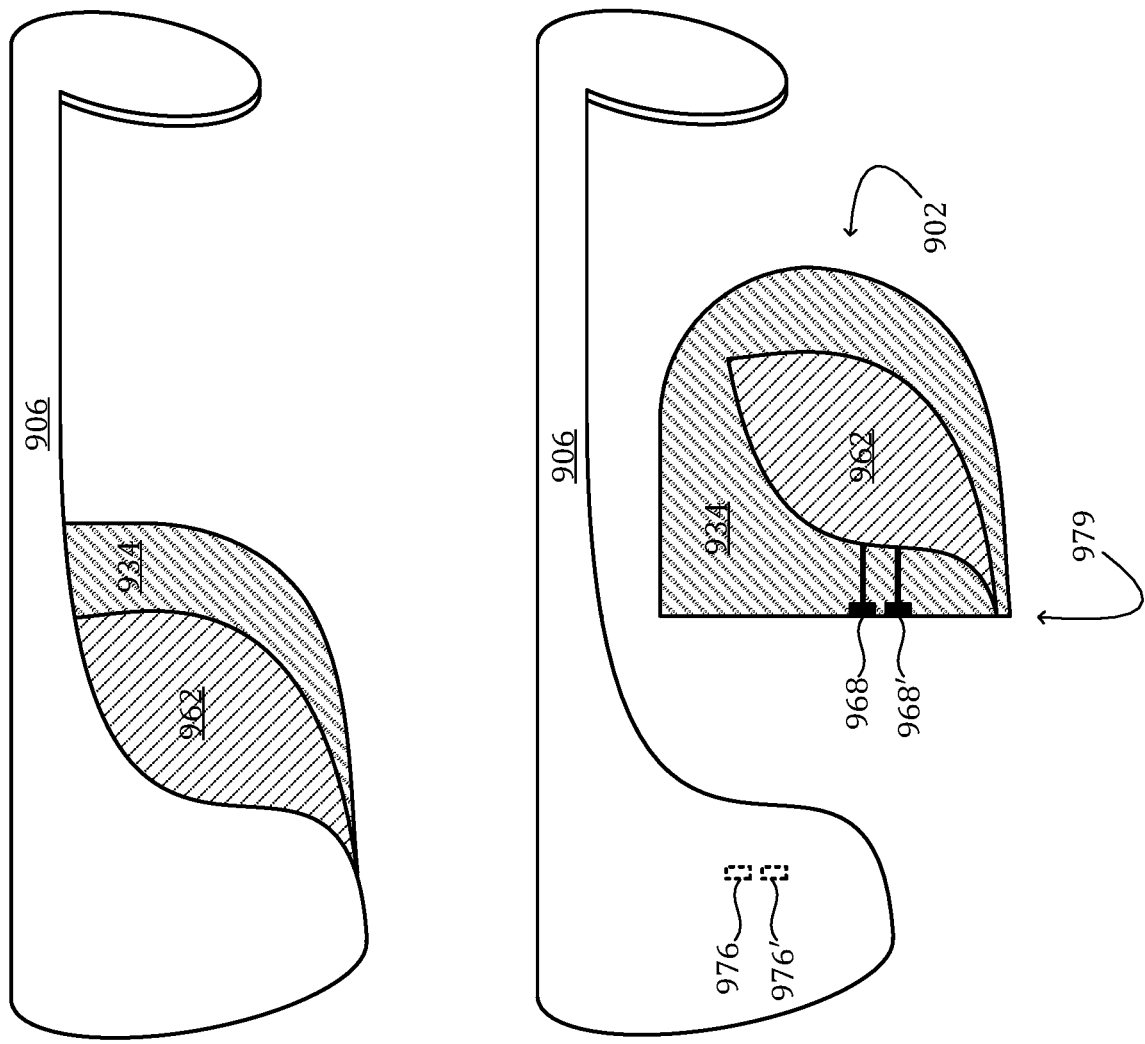

In that spirit, FIG. 9 shows aspects of another vision-control system 902. Vision-control system 902 includes an electrochromic insert 962 configured for arrangement on the left side of head-worn frame 906 of a near-eye display system. As noted above, the electrochromic insert includes at least two transparent electrodes, with at least two peripheral contacts 968 and 968' extending, respectively, to the at least two transparent electrodes. Vision-control system 902 includes a side shield 934 configured for attachment to the left side of the head-worn frame. In the example illustrated in FIG. 9, the side shield is detachable from head-worn frame 906. Peripheral contacts 968 and 968' are configured to mate detachably to corresponding contacts 976 and 976' of the head-worn frame; a control circuit arranged in the head-worn frame is coupled electrically to the peripheral contacts via the corresponding contacts. In this example the peripheral contacts extend to peripheral edge 979 of side shield 934.

Figure 10:
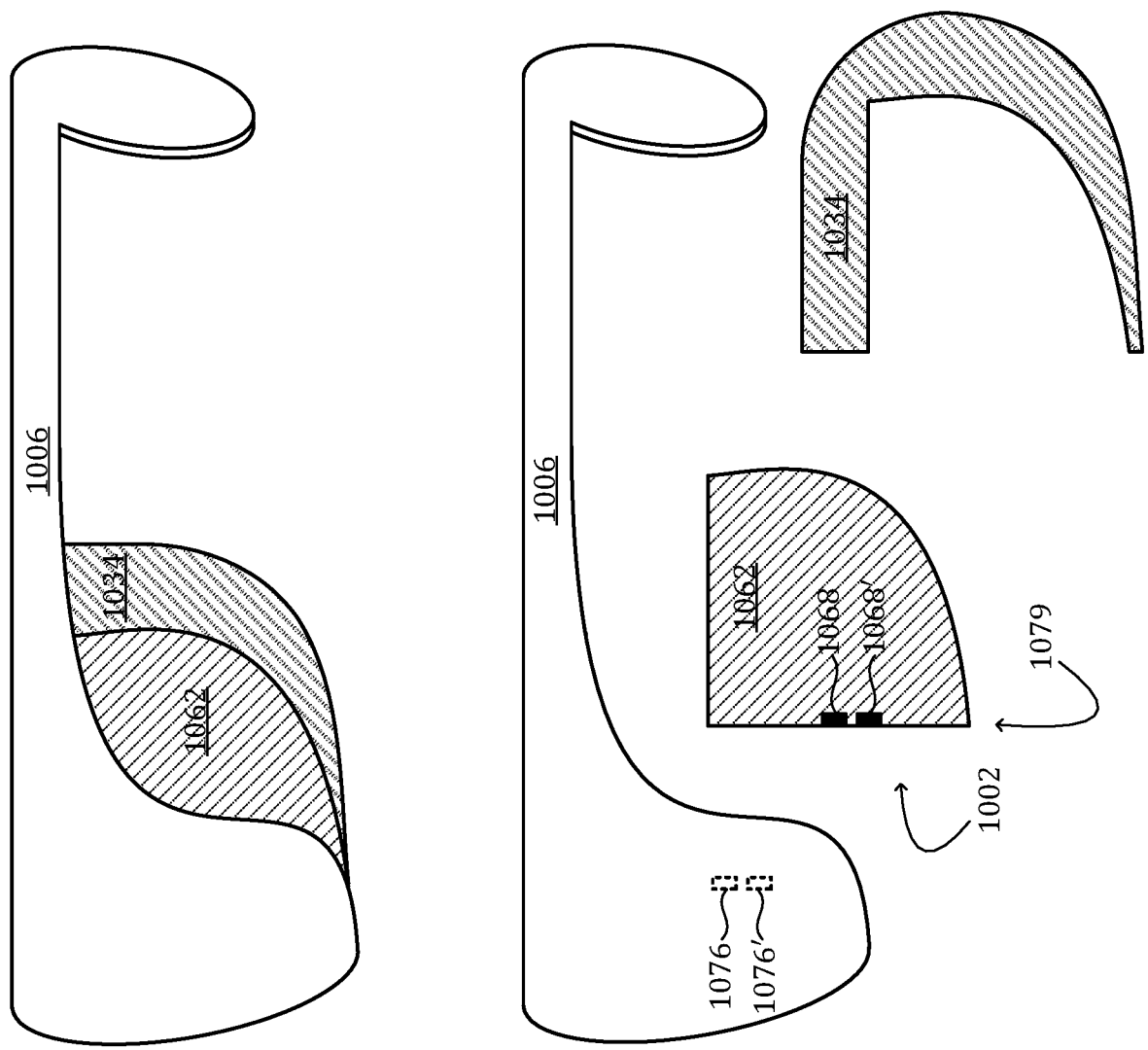

FIG. 10 shows aspects of yet another vision-control system 1002. Vision-control system 1002 includes an electrochromic insert 1062 configured for arrangement on the left side of head-worn frame 1006 of a near-eye display system. As noted above, the electrochromic insert includes at least two transparent electrodes, with at least two peripheral contacts 1068 and 1068' extending, respectively, to the at least two transparent electrodes. Vision-control system 1002 includes a side shield 1034 configured for attachment to the left side of the head-worn frame. In the example illustrated in FIG. 10, side shield 1034 is detachable from the head-worn frame. Peripheral contacts 1068 and 1068' are configured to mate detachably to corresponding contacts 1076 and 1076' of the head-worn frame; a control circuit arranged in the head-worn frame is coupled electrically to the peripheral contacts via the corresponding contacts. The peripheral contacts are arranged on peripheral edge 1079 of the electrochromic insert. Here the electrochromic insert is detachable from side shield 1034 and configured for attachment to the side of the head-worn display frame.

No aspect of the drawings or description should be interpreted in a limiting sense, because numerous variations, extensions, and omissions are also envisaged. In the description above, all of the vision-control systems comprise electrochromic inserts, because this technology offers efficient, lightweight, low-noise bleaching of the side windows of the near-eye display frame. In other examples the side windows may include an electromechanically or piezoelectrically actuated shutter or iris. In still other examples the vision-control system may be configured to pump an opaque fluid into the side windows when low transmittance is desired, and two withdraw the opaque fluid when high transmittance is desired.

In the description above the various electrochromic inserts are least transmissive in the unbiased state and become increasingly transmissive as the applied voltage is increased (as shown in FIG. 4). This functional dependence may be advisable for engineering efficiency and to conserve power in typical use scenarios. Nevertheless, the opposite functional dependence—e.g., the reflection of the graph of FIG. 4—is also envisaged. Furthermore, the term 'electrochromic' should not be construed to limit the underlying cause of the dependence of the optical transmittance on the applied electrical bias. This term is applied herein not only to redox-active film structures, which change absorptivity as a function of the bias, but also to structures such as PDLC films, where the applied electric field influences the anisotropic scattering cross sections of the films. Further still, it will be understood that certain terms of art in materials chemistry, such 'redox-active' and 'oxidation state' hereinabove, have equivalents in the alternative language of materials physics. Thus, the distribution of oxidation states of a redox-active species may relate to the energy-band occupancy of a semiconductor.

Additional contextual description is now provided for the operation of the near-eye display systems herein. Returning briefly to FIG. 2, each display image formed by monocular system 214 is a virtual image presented at a predetermined distance $Z_O$ in front of user O. The distance $Z_O$ is referred to as the 'depth of the focal plane' of the display image. In some monocular systems, the value of $Z_O$ is a fixed function of the design parameters of display projector 218, entry grating 230, exit grating 232, and/or other fixed-function optics. Based on the permanent configuration of these structures, the focal plane may be positioned at a desired depth. In one example, $Z_O$ may be set to 'infinity', so that each optical system presents a display image in the form of collimated light rays. In another example, $Z_O$ may be set to 33 centimeters, requiring the optical system to present each display image in the form of diverging light. In some examples, $Z_O$ may be chosen at design time and remain unchanged for all virtual imagery presented by the display system. Alternatively, the optical systems may be configured with electronically adjustable optical power, to allow $Z_O$ to vary dynamically according to the range of distances over which the virtual imagery is to be presented.

A binocular near-eye display system employing a fixed or variable focal plane may be capable of presenting virtual-display imagery perceived to lie at a controlled, variable distance in front of, or behind, the focal plane. This effect can be achieved by controlling the horizontal disparity of each pair of corresponding pixels of the right and left stereo images, as described below with reference to FIGS. 11A and 11B.

Figure 11B:
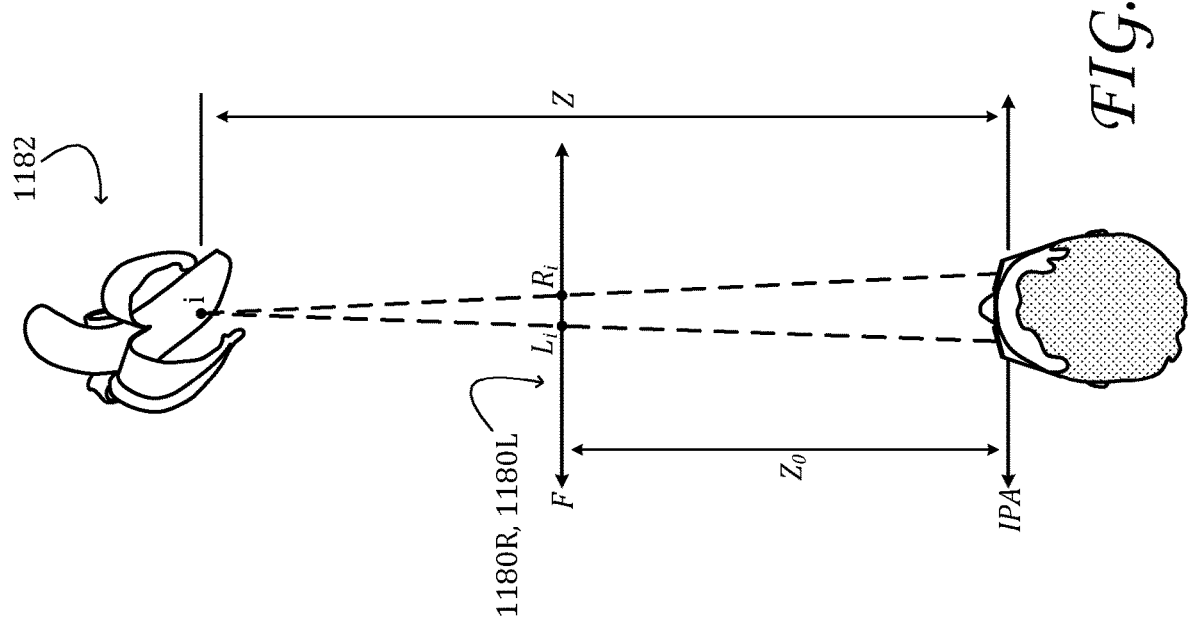
FIGS. 11A and 11B show aspects of stereoscopic display projection.
Figure 11A:
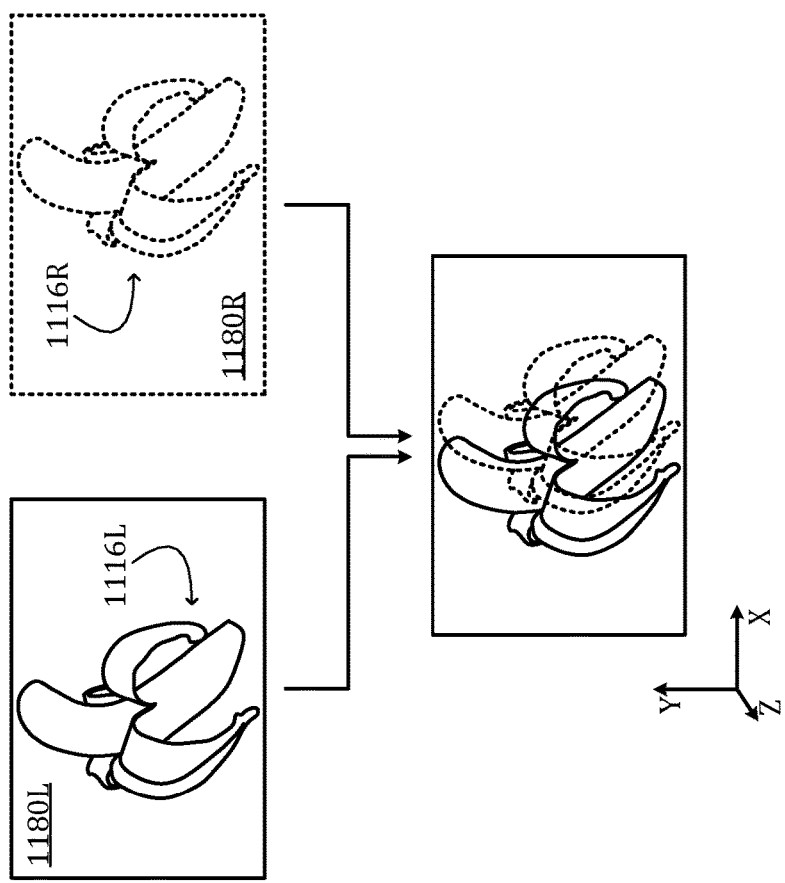

FIG. 11A shows right and left image frames 1180R and 1180L overlaid upon each other for ease of illustration. The right image frame encloses right display image 1116R, and the left image frame encloses left display image 1116L. Viewed concurrently through a near-eye display system 102, the right and left display images may appear to the user as 3D hologram 1182, comprised of individually rendered loci. Each locus i of the visible surface of the hologram has a depth coordinate $Z_i$ associated with a corresponding pixel ($X_i$, $Y_i$) of each of the right and left display images. The desired depth coordinate may be simulated as follows.

At the outset, a distance $Z_0$ to a focal plane F of the near-eye display system is chosen. Then the depth coordinate Z for every locus i of the visible surface of the hologram is set. This is done by adjusting the positional disparity of the two pixels corresponding to locus i in the right and left display images relative to their respective image frames. In FIG. 11B, the pixel corresponding to locus i in the right image frame is denoted $R_i$, and the corresponding pixel of the left image frame is denoted $L_i$. In FIG. 11B, the positional disparity is positive—i.e., $R_i$ is to the right of $L_i$ in the overlaid image frames. Positive positional disparity causes locus i to appear behind focal plane F. If the positional disparity were negative, the locus would appear in front of the focal plane. Finally, if the right and left display images were superposed (no disparity, $R_i$ and $L_i$ coincident) then the locus would appear to lie directly on the focal plane. Without tying this disclosure to any particular theory, the positional disparity D may be related to Z, $Z_0$, and to the interpupillary distance (IPD) of the user by $$D = IPD \times \left(1 - \frac{Z_0}{Z}\right).$$

In some examples, computer 108 maintains a model of the Cartesian space in front of the user, in a frame of reference fixed to near-eye display system 102. The user's pupil positions are mapped onto this space, as are the image frames 1180R and 1180L, each positioned at the predetermined depth $Z_0$. Then, the visible surface of hologram 56 is assembled, with each locus i of the viewable surface of the imagery having coordinates $X_i$, $Y_i$, and $Z_i$, in the common frame of reference. For each locus of the visible surface, two-line segments are constructed—a first line segment to the pupil position of the user's right eye and a second line segment to the pupil position of the user's left eye. The pixel $R_i$ of the right display image, which corresponds to locus i, is taken to be the intersection of the first line segment in right image frame 1180R. Likewise, the pixel $L_i$ of the left display image is taken to be the intersection of the second line segment in left image frame 1180L. This procedure automatically provides the appropriate amount of shifting and scaling to correctly render the visible surface, placing every locus i at the appropriate distance and with the appropriate perspective. In some examples, the approach outlined above may be facilitated by real-time estimation of the user's pupil positions. In examples in which pupil estimation is not attempted, a suitable surrogate for the pupil position, such as the center of rotation of the pupil position, or eyeball position, may be used instead.

Returning again to FIG. 2, controlling the stereo disparity of images confined to a focal plane is appropriate for rendering a three-dimensional effect, but it is less appropriate for shifting an entire display image back and forth in the user's field of view. To resolve depth in a complex scene, the human visual cortex interprets plural visual cues (e.g., occlusion and motion parallax), in addition to the neurologically coupled, oculomotor cues of binocular vergence and crystalline-lens accommodation. Stereo disparity correctly stimulates the binocular-vergence cue but does not stimulate the accommodation cue. Rather, the user's crystalline lenses remain focused on the fixed focal plane no matter the depth value indicated by the stereo disparity. When the disparity changes, but the focal plane does not move, a dissonance is perceived between the two oculomotor cues, which may result in user discomfort.

Accordingly, monocular system 214 of FIG. 2 may be configured to vary the focal plane on which virtual display imagery is presented. In the illustrated example, the monocular system includes a variable-focus lens 284 of variable optical power. Computer 108 is configured to control the focusing bias of the variable-focus lens such that the display light is imaged onto a focal plane positioned at a controlled, variable distance from pupil position 226. In stereoscopic near-eye display systems, this control feature may be enacted in combination with appropriate control of the stereo disparity as described above. Monocular system 214 of FIG. 2 also includes a fixed-focus lens 286 in series with variable-focus lens 284 and arranged to pre-bias the vergence of the display light released from expansion optic 224.

Applied in an AR display system, variable-focus lens 284 and/or fixed-focus lens 286 would alter the vergence of the external light received from opposite the user. In FIG. 2, accordingly, monocular system 214 further comprises a variable-compensation lens 288 of variable optical power and a fixed compensation lens 290. In some examples, the fixed optical power of fixed-compensation lens 290 may oppose and substantially reverse the fixed optical power of fixed-focus lens 286. When controlling the focusing bias such that the display light is imaged onto a focal plane positioned at a controlled, variable distance from user O, computer 108 may also synchronously control the compensation bias of the variable compensation lens such that the external light reaches the user with unchanged vergence.

As noted above, the methods herein may be tied to a computer system of one or more computing devices. Such methods and processes may be implemented as an application program or service, an application programming interface (API), a library, and/or other computer-program product.

Figure 12:
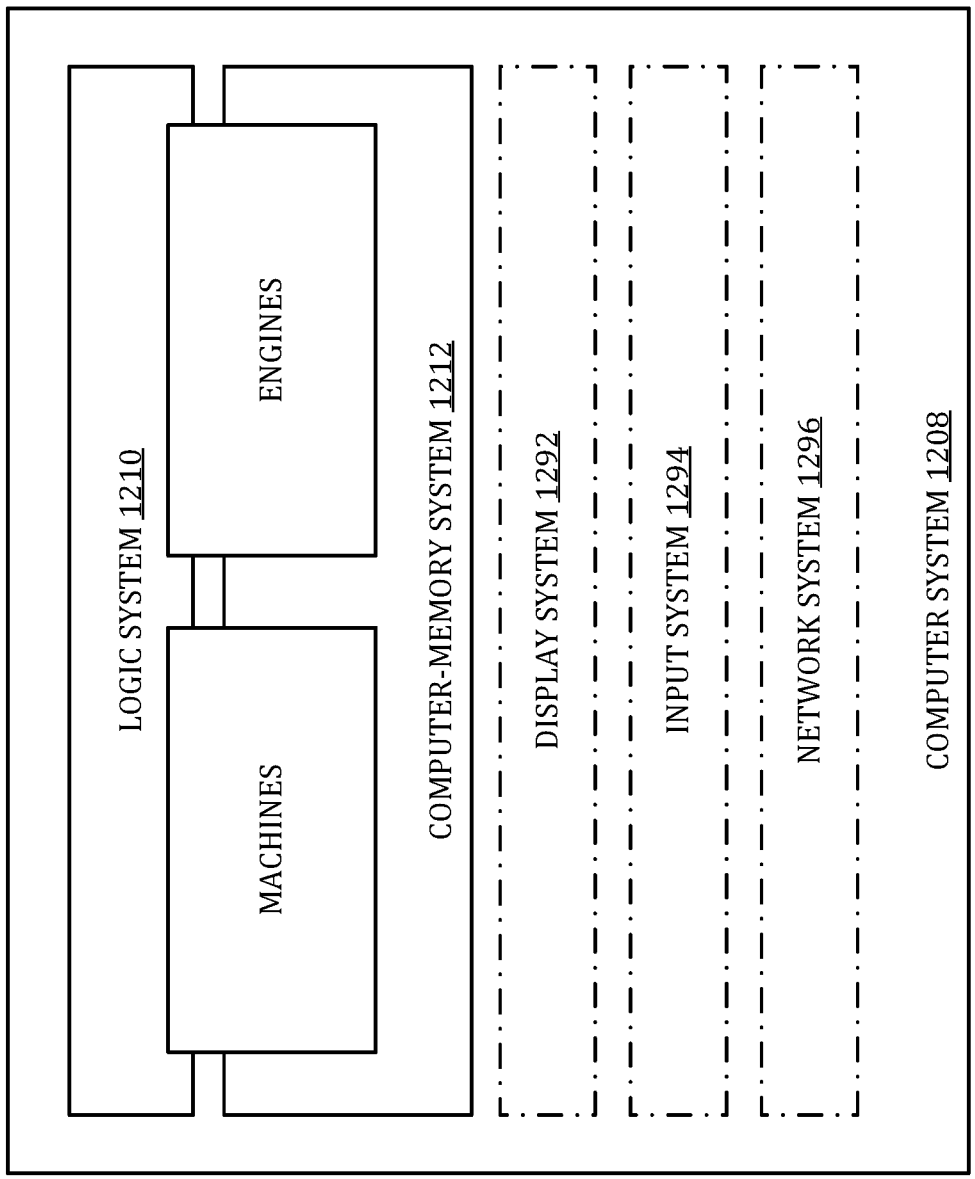
FIG. 12 shows aspects of an example computer system.

FIG. 12 provides a schematic representation of a computer system 1208 configured to provide some or all of the computer system functionality disclosed herein. Computer system 1208 may take the form of a personal computer, application-server computer, or any other computing device.

Computer system 1208 includes a logic system 1210 and a computer-memory system 1212. Computer system 1208 may optionally include a display system 1292, an input system 1294, a network system 1296, and/or other systems not shown in the drawings.

Logic system 1210 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 1212 includes at least one physical device configured to temporarily and/or permanently hold computer system information, such as data and instructions executable by logic system 1210. When the computer-memory system includes two or more devices, the devices may be collocated or remotely located. Computer-memory system 1212 may include at least one volatile, nonvolatile, dynamic, static, read/write, read-only, random-access, sequential-access, location-read addressable, file-read addressable, and/or content-read addressable computer-memory device. Computer-memory system 1212 may include at least one removable and/or built-in computer-memory device. When the logic system executes instructions, the state of computer-memory system 1212 may be transformed—e.g., to hold different data.

Aspects of logic system 1210 and computer-memory system 1212 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 1210 and computer-memory system 1212 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 1292 may be used to present a visual representation of data held by computer-memory system 1212. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 1294 may comprise or interface with one or more input devices. An input device may include a sensor device or a user input device. Examples of user input devices include a keyboard, mouse, or touch screen.

When included, network system 1296 may be configured to communicatively couple computer system 1208 with one or more other computer systems. The network system may include wired and/or wireless communication devices compatible with one or more different communication protocols. The network system may be configured for communication via personal-, local- and/or wide-area networks.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

In conclusion, one aspect of this disclosure is directed to a vision-control system comprising a near-eye display system coupled to a head-worn frame, a vision system providing pass-thru video to the near-eye display system, and an electrochromic insert with at least two peripheral contacts and a control circuit. The electrochromic insert is arranged on a side of the head-worn frame, with the peripheral contacts extending, respectively, to at least two transparent electrodes. The control circuit is coupled electrically to the peripheral contacts and configured to apply a voltage to the peripheral contacts pursuant to a control signal, to vary an optical transmittance of the electrochromic insert.

In some implementations the electrochromic insert is configured to be received into a side shield, which is configured for attachment to the side of the head-worn frame. In some implementations the vision-control system further comprises a motion sensor, wherein the control signal is raised pursuant to motion sensing by the motion sensor. In some implementations the vision-control system further comprises a microphone, wherein the control signal is raised pursuant to detection of sound picked up by the microphone.

Another aspect of this disclosure is directed to a vision-control system comprising an electrochromic insert and at least two peripheral contacts. The electrochromic insert includes at least two transparent electrodes and is configured for arrangement on a side of a head-worn frame of a near-eye display system. The peripheral contacts extend to the transparent electrodes, and the optical transmittance of the electrochromic insert varies in dependence on an electrical bias applied to the transparent electrodes.

In some implementations the peripheral contacts are configured to mate detachably to corresponding contacts of the head-worn frame. In some implementations the peripheral contacts are arranged on a peripheral edge of the electrochromic insert. In some implementations the vision-control system further comprises a side shield configured for attachment to the side of the head-worn frame, wherein the peripheral contacts extend to a peripheral edge of the side shield. In some implementations the electrochromic insert is detachable from a side shield configured for attachment to the side of the head-worn frame. In some implementations the vision-control system further comprises a control circuit coupled electrically to the peripheral contacts and configured to apply a voltage to the peripheral contacts pursuant to a control signal, to vary an optical transmittance of the electrochromic insert. In some implementations the voltage applied between the at least two transparent electrodes increases an optical transmittance of the electrochromic insert. In some implementations the electrochromic insert includes a polymer-dispersed liquid-crystal film arranged between the at least two transparent electrodes. In some implementations the at least two transparent electrodes include first and second transparent electrodes, the electrochromic insert includes a first electrochromic-conduction layer adjacent the first transparent electrode, a second electrochromic-conduction layer adjacent the second transparent electrode, and an ion-conduction layer intermediate to the first and second electrochromic-conduction layers. In some implementations the at least two transparent electrodes include a common electrode and a series of opposing electrodes stacked parallel to the common electrode, wherein each of the opposing electrodes is biased independently via independent contact, and wherein the electrochromic- and ion-conduction layers are segmented in registry with the series of opposing electrodes. In some implementations the electrochromic insert curves around from the side of the head-worn frame to a top or bottom of the head-worn frame. In some implementations the vision-control system further comprises a near-eye display system and a world-facing camera coupled to the head-worn frame.

Another aspect of this disclosure is directed to a method to operate a vision-control system with an electrochromic insert arranged on a side of a head-worn frame of a near-eye display system. The method comprises (a) receiving a control signal; and (b) pursuant to receiving the control signal, electrically biasing at least two peripheral contacts coupled electrically to at least two transparent electrodes of the electrochromic insert. The optical transmittance of the electrochromic insert varies in dependence on an electrical bias applied to the transparent electrodes.

In some implementations the control signal is raised pursuant to input from a user of a near-eye display system arranged in the head-worn frame. In some implementations the control signal is raised pursuant to a voice command of the user.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. In that spirit, the phrase 'based at least partly on' is intended to remind the reader that the functional and/or conditional logic illustrated herein neither requires nor excludes suitable additional logic, executing in combination with the illustrated logic, to provide additional benefits.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A vision-control system comprising:
 a near-eye display system including opaque, right and left monocular systems;
 a head-worn frame coupled to the near-eye display system and configured to position the right monocular system in front of a right eye and the left monocular system in front of a left eye;
 an electrochromic insert arranged on a peripheral side of the head-worn frame, right of the right eye or left of the left eye, the electrochromic insert including at least two transparent electrodes;
 at least two peripheral contacts extending, respectively, to the at least two transparent electrodes;
 a control circuit coupled electrically to the peripheral contacts and configured to apply a voltage to the peripheral contacts pursuant to a control signal, to vary an optical transmittance of the electrochromic insert;
 a vision system including at least one world-facing camera configured to acquire video of a scene in front of the right and left eyes and present the video as pass-thru video to the near eye display system.

2. The vision-control system of claim 1 wherein the electrochromic insert is configured to be received into a side shield, which is configured for attachment to the side of the head-worn frame.

3. The vision-control system of claim 1 further comprising a motion sensor, wherein the control signal is raised pursuant to motion sensing by the motion sensor.

4. The vision-control system of claim 1 further comprising a microphone, wherein the control signal is raised pursuant to detection of sound picked up by the microphone.

5. A vision-control system comprising:
 an electrochromic insert configured for arrangement on a peripheral side of a head-worn frame of a near-eye display system, right of a right eye or left of a left eye, the near-eye display system including opaque, right and left monocular systems coupled to the head-worn frame and configured to position the right monocular system in front of the right eye and the left monocular system in front of the left eye,
 at least two transparent electrodes arranged on the electrochromic insert, wherein an optical transmittance of the electrochromic insert varies in dependence on an electrical bias applied to the transparent electrodes; and
 at least two peripheral contacts extending, respectively, to the at least two transparent electrodes.

6. The vision-control system of claim 5 wherein the peripheral contacts are configured to mate detachably to corresponding contacts of the head-worn frame.

7. The vision-control system of claim 5 wherein the peripheral contacts are arranged on a peripheral edge of the electrochromic insert.

8. The vision-control system of claim 5 further comprising a side shield configured for attachment to the side of the head-worn frame, wherein the peripheral contacts extend to a peripheral edge of the side shield.

9. The vision-control system of claim 5 wherein the electrochromic insert is detachable from a side shield configured for attachment to the side of the head-worn frame.

10. The vision-control system of claim 5 further comprising a control circuit coupled electrically to the peripheral contacts and configured to apply a voltage to the peripheral contacts pursuant to a control signal, to vary an optical transmittance of the electrochromic insert.

11. The vision-control system of claim 5 wherein voltage applied between the at least two transparent electrodes increases an optical transmittance of the electrochromic insert.

12. The vision-control system of claim 5 wherein the electrochromic insert includes a polymer-dispersed liquid-crystal film arranged between the at least two transparent electrodes.

13. The vision-control system of claim 5 wherein the at least two transparent electrodes include first and second transparent electrodes, wherein the electrochromic insert includes a first electrochromic-conduction layer adjacent the first transparent electrode, a second electrochromic-conduction layer adjacent the second transparent electrode, and an ion-conduction layer intermediate to the first and second electrochromic-conduction layers.

14. The vision-control system of claim 13 wherein the at least two transparent electrodes include a common electrode and a series of opposing electrodes stacked parallel to the common electrode, wherein each of the opposing electrodes is biased independently via independent contact, and wherein the electrochromic- and ion-conduction layers are segmented in registry with the series of opposing electrodes.

15. The vision-control system of claim 5 wherein the electrochromic insert curves around from the side of the head-worn frame to a top or bottom of the head-worn frame.

16. The vision-control system of claim 5 further comprising a near-eye display system and a world-facing camera coupled to the head-worn frame.

17. A method to operate a vision-control system, the method comprising:
receiving a control signal; and
pursuant to receiving the control signal, electrically biasing at least two peripheral contacts coupled electrically to at least two transparent electrodes of an electrochromic insert arranged on a peripheral side of a head-worn frame of a near-eye display system, right of a right eye or left of a left eye, the near-eye display system including opaque, right and left monocular systems coupled to the head-worn frame and configured to position the right monocular system in front of the right eye and the left monocular system in front of the left eye,
wherein an optical transmittance of the electrochromic insert varies in dependence on an electrical bias applied to the transparent electrodes.

18. The method of claim 17 wherein the control signal is raised pursuant to input from a user of a near-eye display system arranged in the head-worn frame.

19. The method of claim 18 wherein the control signal is raised pursuant to a voice command of the user.

20. The method of claim 17 further comprising sensing motion around the head-worn frame, wherein the control signal is raised pursuant to sensing the motion.

* * * * *